V. ARLUSKES.
COMPRESSOR.
APPLICATION FILED MAY 28, 1918.
1,337,501.
Patented Apr. 20, 1920.
3 SHEETS—SHEET 3.
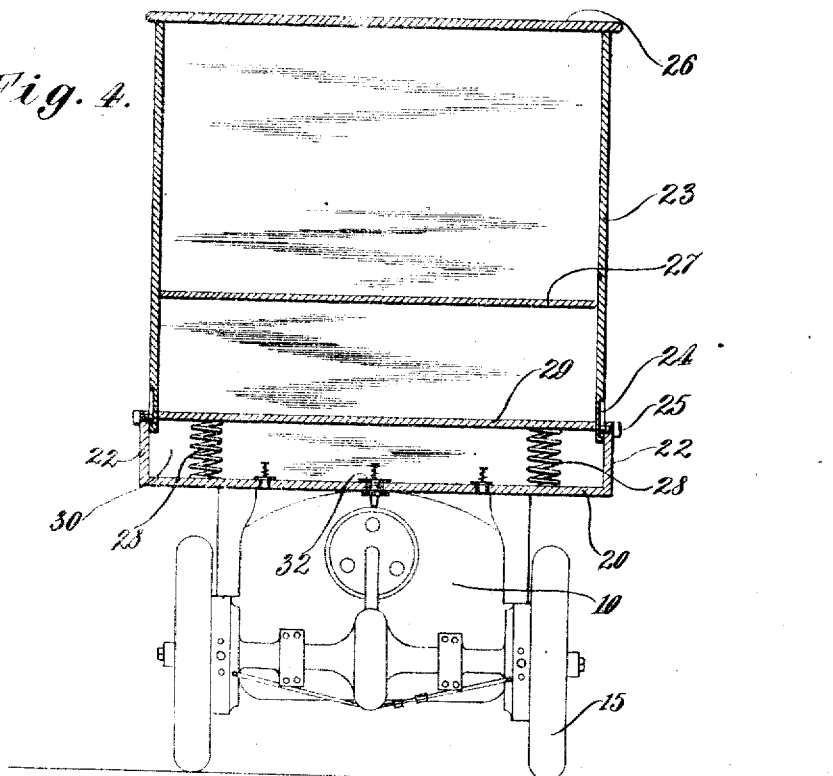
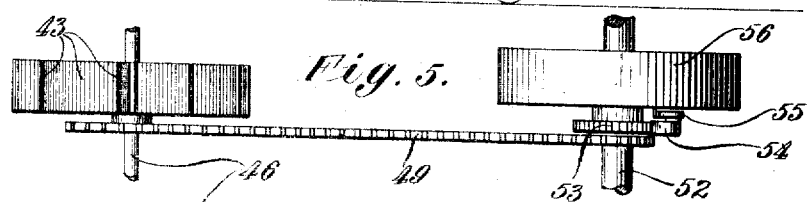
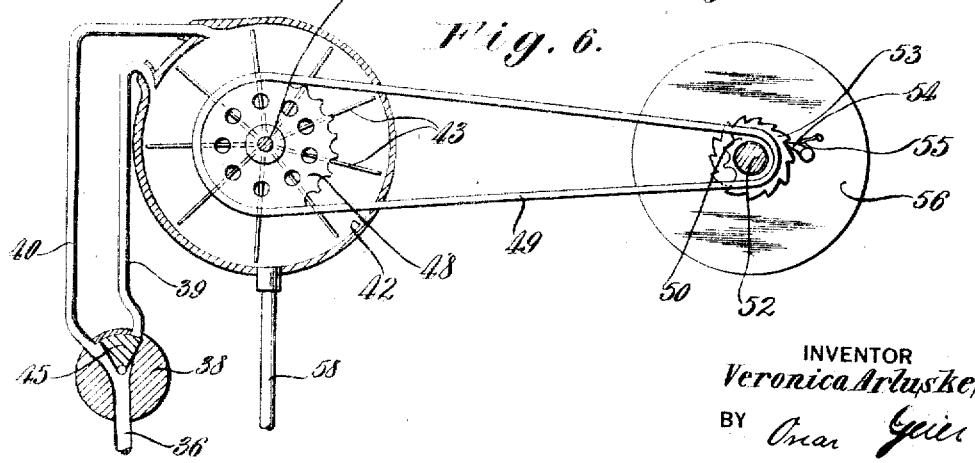
INVENTOR
*Veronica Arluskes*
BY
her ATTORNEY

# UNITED STATES PATENT OFFICE.

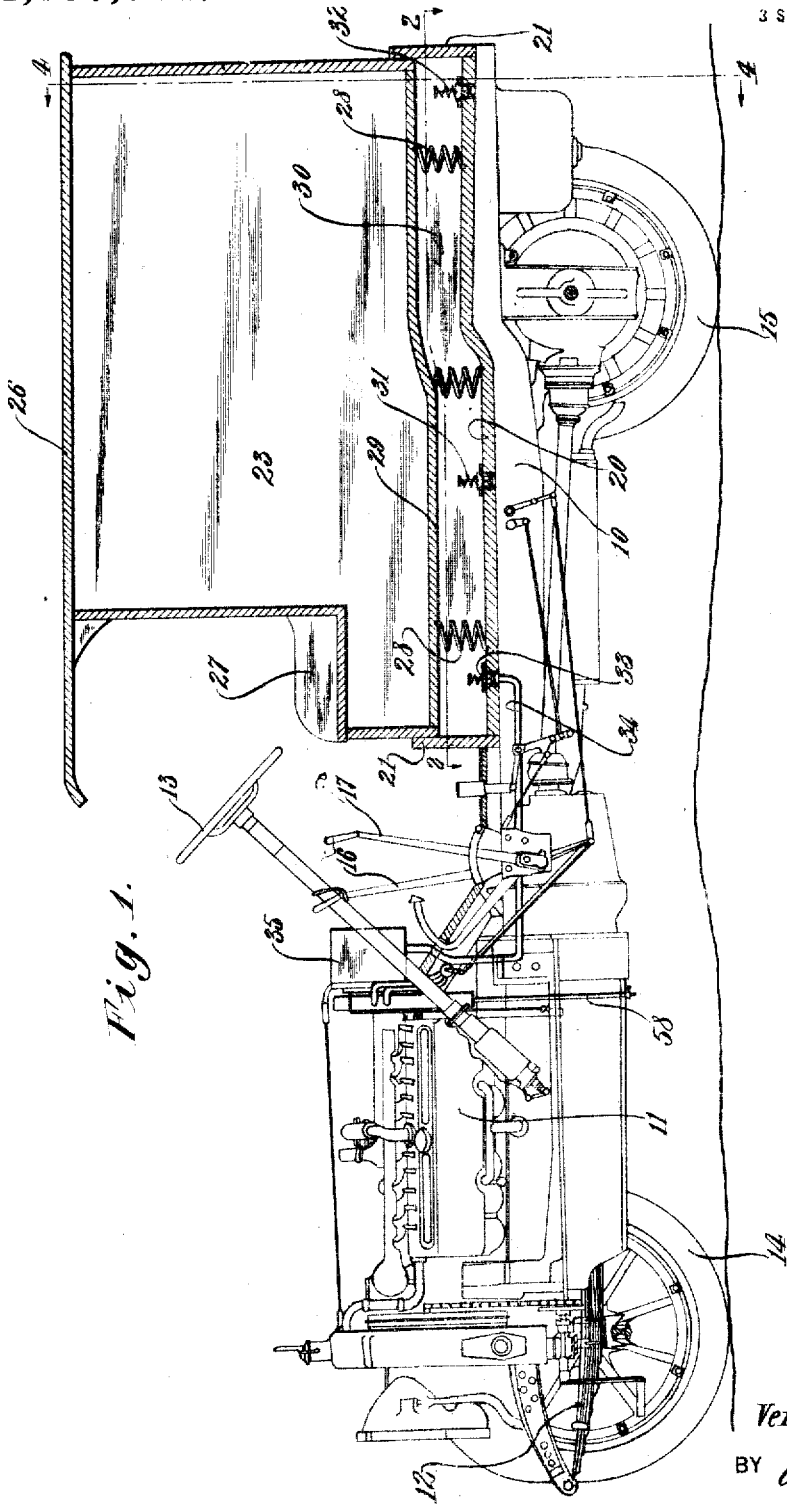

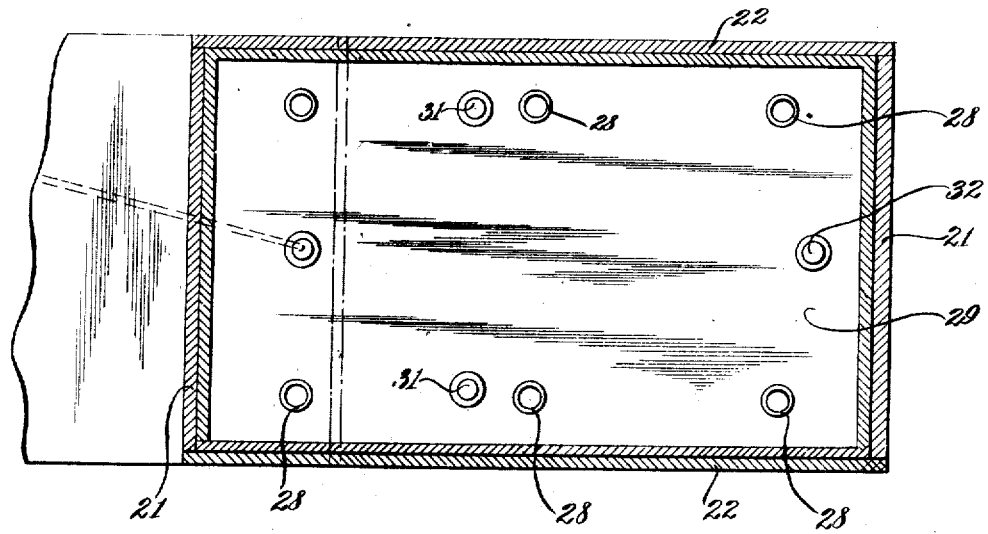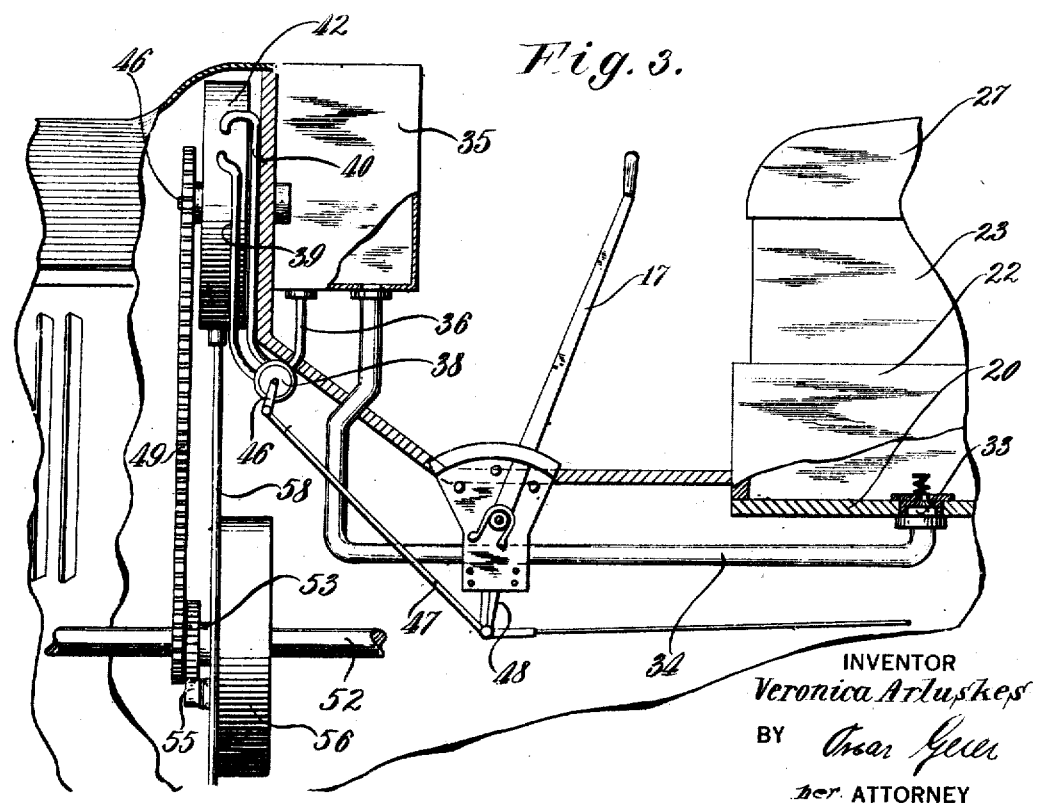

VERONICA ARLUSKES, OF BRIDGEPORT, CONNECTICUT.

COMPRESSOR.

1,337,501.　　　　Specification of Letters Patent.　　Patented Apr. 20, 1920.

Application filed May 28, 1918. Serial No. 237,065.

*To all whom it may concern:*

Be it known that I, VERONICA ARLUSKES, a citizen of Russia, residing at Bridgeport, county of Fairfield, and State of Connecticut, have invented certain new and useful Improvements in Compressors, of which the following is a specification.

This invention relates to improvements in compressors to be used with automobiles and other like self-propelled vehicles, having as its special object the provision of means whereby the power of the motor may be materially augmented, due to the motion of the vehicle body.

A further object is to provide a vehicle in which the body portion is resiliently supported over a chamber containing springs and in which air is compressed by the rebounding and oscillatory movement of the vehicle body.

These and other like objects are attained by the novel construction and combination of parts hereinafter described and shown in the accompanying drawings, forming a material part of this disclosure, and in which:—

Figure 1 is a partial side elevation and vertical sectional view, showing a conventional type of automobile and indicating the application of the invention.

Fig. 2 is a horizontal sectional view taken on line 2—2 of Fig. 1.

Fig. 3 is an enlarged fragmentary vertical sectional view, showing the power applying means.

Fig. 4 is a vertical sectional view taken on line 4—4 of Fig. 1.

Fig. 5 is an enlarged side elevational view, showing a slight modification in construction, and Fig. 6 is a side view of the same.

In the drawings, the numeral 10 indicates an auto truck, provided with a conventional type of engine or motor 11 at the front, the same being supported by springs 12, carried upon the axle between front wheels 14, and guided by the steering wheel 13 as is common.

The rear or driving wheels 15 are directly connected by suitable transmission mechanism with the motor so as to cause the vehicle to operate when the motor is engaged.

A brake lever 16 and reverse lever 17 are provided, the vehicle being in all respects of ordinary construction. Secured to the truck 10 at the rear over the driving wheels 15 is an air tight flooring 20, having rigid vertical end walls 21 and side walls 22, forming in effect a low, rigid rectangular casing adapted to receive the body 23, in the opposite sides of which are formed recesses 24, receptive of the points of the screws 25, thereby maintaining the body engaged within the inclosing casing, and yet permitting it to move vertically to a limited extent therein.

This body has a roof 26 extending over the driver's seat 27, arranged convenient to the steering wheel and brake levers, as can best be seen in Fig. 1.

The bottom of the body consists of a flooring 29 solid and imperforate, the body fitting closely within the surrounding walls 21 and 22, resting upon a plurality of coiled compression springs 28, their number and location being such as to give the body 23, a desirable resiliency.

The springs are contained within a chamber 30 formed between the floorings 20 and 29, and set in the lower flooring 20 centrally of the chamber and near its sides are a pair of intake valves 31, another similar valve 32 being arranged in the rear, the valves being adapted to admit air as the body is raised or oscillated, and due to the suction of the body in the chamber, acting as a plunger, there is obtained a quantity of compressed air which passes out through an outlet valve 33 arranged near the front of the compartment in the flooring 20. Extending from the outlet valve is a pipe 34, turned upwardly at the front end, and entered into a tank 35, secured adjacent to the front of the car and adapted to retain the air forced therein by the device described, the tank acting as a reservoir for the compressed air.

Leading outward from the tank 35 is a pipe 36 engaged with a three-way valve 38 from which lead pipes 39 and 40 entering into a cylindrical casing 42, containing the vanes or paddles 43 of a rotary engine, the pipe 39 being reëntrantly bent so as to direct the current of compressed air against one side of the vanes, while the pipe 40, entering the casing tangentially, is adapted to deliver a similar current to the opposite side of the vanes thereby turning the engine in either direction. The pipes 39 and 40 are controlled by the three-way valve 38 in which is a directing segment 45 connected with a crank 46', operable by a lever 47, pivotally connected to the extending arm 48, formed with the reverse lever 17, so that as the motor is reversed the engine is also simultaneously reversed, the exhaust from the rotary engine taking place into the atmosphere through the pipe 58.

The several vanes 43 of the engine are fixed upon a shaft 46, mounted axially in the cylindrical casing 42 and secured upon one of the extending ends of the shaft 46 is a sprocket 48 conveying rotary motion by a chain 49 to another sprocket 50, mounted to rotate on the motor shaft 52, and having rigidly engaged upon its sides the ratchet wheel 53, the teeth of which are engaged by a pivoted pawl 54, normally pressed into engagement by a spring 55, the ratchet and spring being secured to the side of a relatively heavy fly wheel 56 fixed upon the shaft 52.

In operation, the parts having been assembled as indicated, it will be obvious that in passing over even a relatively level surface, the car body 23, due to the jar transmitted to the vehicle, is caused to rebound, thus alternately raising and lowering and also oscillating the body to a certain extent, drawing in air through the valves 31 and 32 and dispensing the same through the valve 33 into the rotary engine to such an extent as to provide an auxiliary source of power for the motor, and it will be obvious that, due to the connection with the reverse lever, that the same will be operated in accordance with the direction of the motor, thereby materially augmenting its power without expenditure of useful energy.

Having thus described my invention what I claim as new, and desire to secure by Letters Patent, is:—

1. In a supplementary power device for self-propelled vehicles, the combination with a truck, of a body resiliently mounted on said truck, an airtight chamber formed between the lower portion of said body and said truck, a plurality of springs in said chamber upon which said body rests, valves admitting air to said chamber, an outlet valve leading from said chamber, a reservoir for the compressed air, and connections between said outlet valve and said reservoir.

2. In a supplementary power means for self-propelled vehicles, the combination with a truck, of a rectangular casing rising from said truck, a car body slidably engaged therein, a chamber formed between the lower portion of said car body and said truck, a plurality of compression springs in said chamber by which said body is supported, air inlet valves entering said chamber, a single outlet valve from said chamber, an air reservoir, and tubular connections between said outlet valve and said air reservoir.

In testimony whereof I have affixed my signature.

VERONICA ARLUSKES.